United States Patent
Shu et al.

(10) Patent No.: US 9,554,033 B2
(45) Date of Patent: Jan. 24, 2017

(54) FOCUS DETECTION APPARATUS, METHOD OF CONTROLLING THE SAME, AND STORAGE MEDIUM

(71) Applicant: CANON KABUSHIKI KAISHA, Tokyo (JP)

(72) Inventors: Takayuki Shu, Kawasaki (JP); Takashi Ichimiya, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 122 days.

(21) Appl. No.: 14/658,821

(22) Filed: Mar. 16, 2015

(65) Prior Publication Data

US 2015/0271385 A1   Sep. 24, 2015

(30) Foreign Application Priority Data

Mar. 18, 2014 (JP) .................................. 2014-055621

(51) Int. Cl.
*H04N 5/225* (2006.01)
*H04N 5/232* (2006.01)
*H04N 5/361* (2011.01)

(52) U.S. Cl.
CPC .......... *H04N 5/23212* (2013.01); *H04N 5/361* (2013.01)

(58) Field of Classification Search
None
See application file for complete search history.

(56) References Cited

U.S. PATENT DOCUMENTS

| | | | | |
|---|---|---|---|---|
| 2008/0129847 A1* | 6/2008 | Kobayashi | ........... | H04N 5/3728 348/243 |
| 2010/0073527 A1* | 3/2010 | Ichimiya | ................ | H04N 5/367 348/247 |
| 2012/0320241 A1* | 12/2012 | Sugawara | ............ | H04N 5/3696 348/246 |
| 2013/0038778 A1* | 2/2013 | Ichimiya | ............ | H04N 5/23212 348/349 |
| 2015/0281557 A1* | 10/2015 | Hirosawa | ............. | H04N 5/2258 348/208.12 |

FOREIGN PATENT DOCUMENTS

JP   2001-177756 A   6/2001
JP   2003-222786 A   8/2003

\* cited by examiner

*Primary Examiner* — Twyler Haskins
*Assistant Examiner* — Wesley Chiu
(74) *Attorney, Agent, or Firm* — Cowan, Liebowitz & Latman, P.C.

(57) ABSTRACT

A focus detection apparatus comprises a line sensor including a photoelectric conversion element and an integrating capacitor, a storage unit configured to store information concerning a defective pixel, a first comparison unit configured to compare a signal from the defective pixel with a predetermined threshold, a switching unit configured to switch between a first accumulation mode and a second accumulation mode, and a control unit configured to control the switching unit so as to set the line sensor in the first accumulation mode if the first comparison unit determines that a signal from the defective pixel is not more than the predetermined threshold and set the line sensor in the second accumulation mode if the first comparison unit determines that a signal from the defective pixel is larger than the threshold.

10 Claims, 18 Drawing Sheets

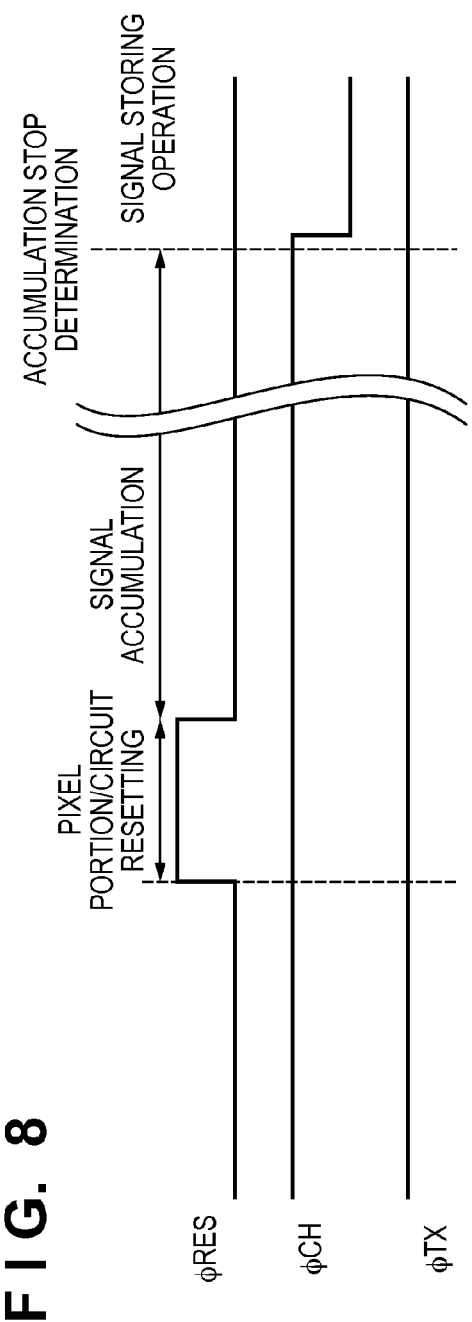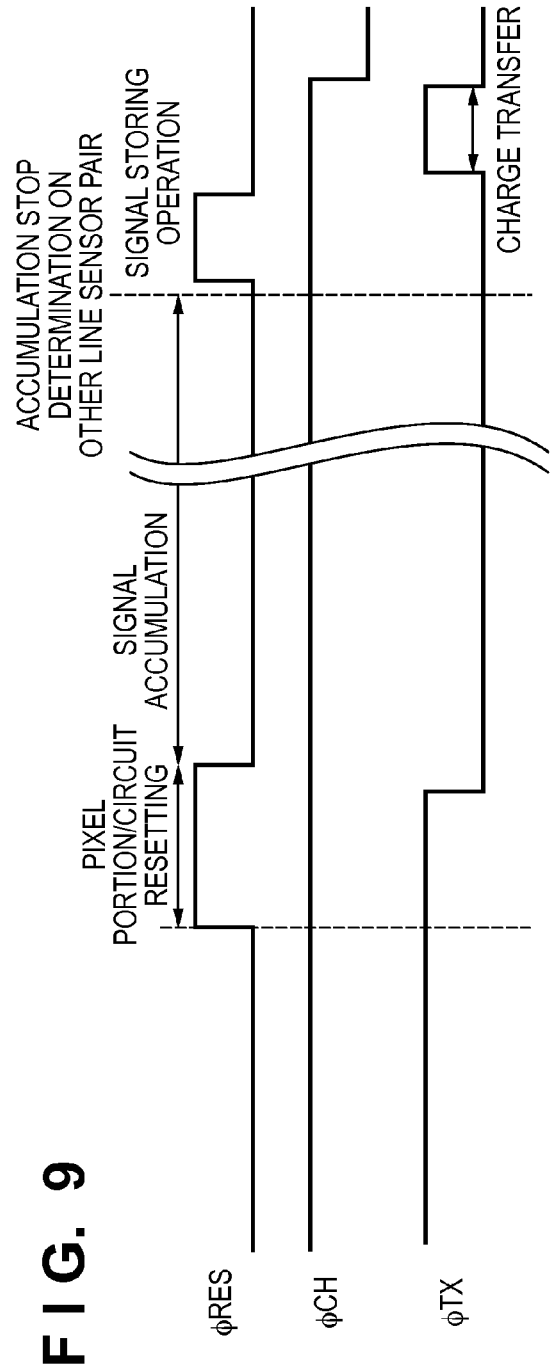

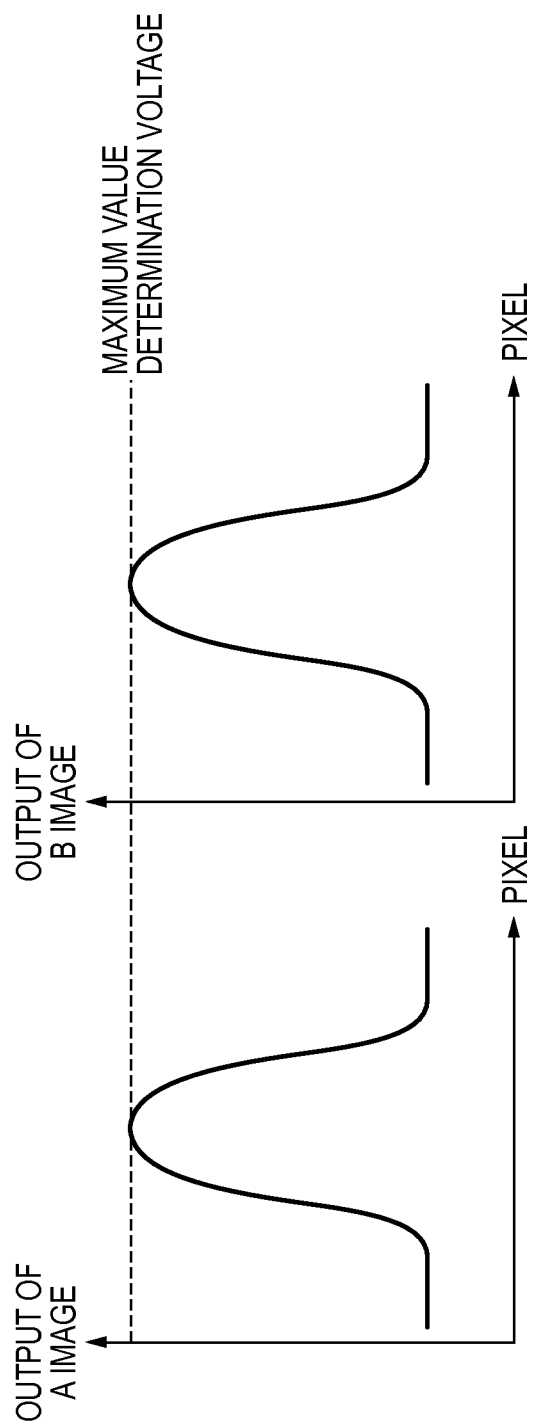

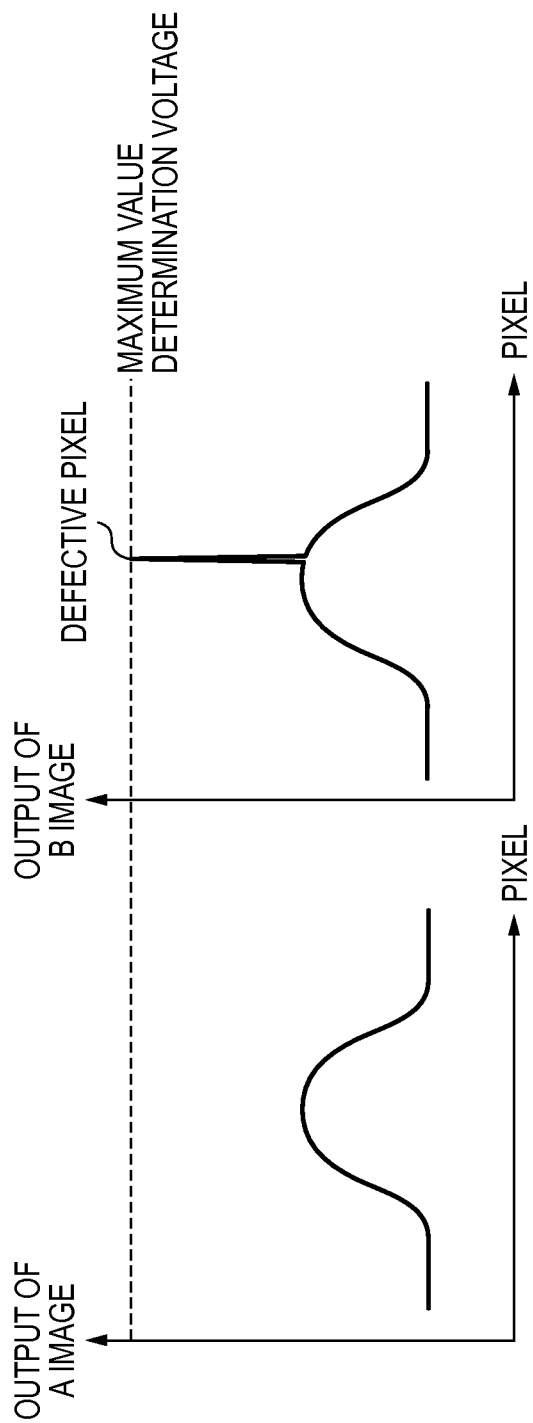

FOCUS DETECTION APPARATUS, METHOD OF CONTROLLING THE SAME, AND STORAGE MEDIUM

BACKGROUND OF THE INVENTION

Field of the Invention

The present invention relates to a technique of improving focus detection accuracy in a focus detection apparatus.

Description of the Related Art

Conventionally, a phase difference detection method is generally known as an automatic focus detection method for a camera. According to the phase difference detection method, light beams from an object which have passed through different exit pupil areas of an imaging lens are formed into images on a pair of line sensors provided in an AF sensor. The relative positions of a pair of object images obtained by photoelectrical conversion using a pair of line sensors are computed to detect the defocus amount of the imaging lens (focus detection computation).

In such focus detection apparatuses, for the purpose of increasing the number of detection points of defocus amounts with respect to a plurality of objects and improving resolution, there is recently a tendency toward increasing the number of photoelectric conversion portions for acquiring focus detection images. On the other hand, an increase in the number of photoelectric conversion portions makes it very difficult to completely remove defects in the manufacture.

The following are known literatures concerning automatic focus detection techniques based on such a phase difference detection method. For example, Japanese Patent Laid-Open No. 2003-222786 discloses an AF sensor which performs gain control and accumulation time control based on the maximum value signals of line sensor signals and the difference signal between the maximum value signal and the minimum value signal. In addition, Japanese Patent Laid-Open No. 2001-177756 discloses a technique of obtaining a signal for focus detection by excluding a signal from a defective photoelectric conversion portion based on information concerning a defective pixel portion checked in advance in a manufacturing process or the like.

The technique disclosed in Japanese Patent Laid-Open No. 2003-222786 described above, however, has a problem that if there is a defect in a photoelectric conversion pixel portion of a line sensor, charge accumulation is finished before a sufficient object image signal is obtained.

The following is a detailed description of this problem. Assume that one of the images of an object formed on a pair of line sensors is represented by A image, and the other image is represented by B image. FIGS. 17A and 17B each show an example of a signal obtained from object images when there is no defective pixel portion. When an output signal reaches the maximum value determination voltage, an accumulation stop is determined, and the accumulation period is finished. In contrast, FIGS. 18A to 18C each show an example of a dark-time waveform when there is a defective pixel portion. A signal increase due to a dark current in the defective pixel portion is larger than that in a normal pixel portion. FIG. 19 shows how accumulation control is performed based on the maximum value signal for the same object as that in the case shown in FIGS. 17A and 17B when there is a defective pixel portion like that in the case shown in FIGS. 18A to 18C. Since an accumulation stop is determined when the defective pixel signal reaches the maximum value of the signal, the accumulation period is finished before signals are accumulated to an intended amount. As a result, the object signals in FIGS. 17A and 17B become those shown in FIGS. 20A and 20B. This makes it impossible to obtain a sufficient signal amount, leading to a decrease in the S/N ratio of a signal and a deterioration in focus detection computation accuracy.

In addition, as disclosed in Japanese Patent Laid-Open No. 2001-177756, it is possible to perform accumulation control upon excluding a signal from a defective photoelectric conversion portion based on information concerning a defective pixel portion checked in advance in a manufacturing process or the like. However, since focus detection computation is performed while a value is compensated from other pixel signals, it is not always possible to obtain a correct computation result.

SUMMARY OF THE INVENTION

The present invention has been made in consideration of the above problem, and provides a focus detection apparatus which can perform accurate focus detection by performing accumulation control on an AF sensor while reducing the influence of a defective pixel portion.

According to the first aspect of the present invention, there is provided a focus detection apparatus comprising: a line sensor including a photoelectric conversion element configured to receive light from an object and an integrating capacitor configured to integrate charges generated in the photoelectric conversion element; a storage unit configured to store information concerning a defective pixel of the line sensor; a first comparison unit configured to compare a signal from the defective pixel with a predetermined threshold; a switching unit configured to switch between a first accumulation mode of transferring charges generated in the photoelectric conversion element to the corresponding integrating capacitor during a charge accumulation period of the photoelectric conversion element and a second accumulation mode of accumulating, in a pixel, charges generated in the photoelectric conversion element during the charge accumulation period without transferring the charges to the integrating capacitor until an end of the charge accumulation period, transferring the charges to the integrating capacitor after the end of the charge accumulation period, and integrating the charges in the integrating capacitor; and a control unit configured to control the switching unit so as to set the line sensor in the first accumulation mode if the first comparison unit determines that a signal from the defective pixel is not more than the predetermined threshold and set the line sensor in the second accumulation mode if the first comparison unit determines that a signal from the defective pixel is larger than the threshold.

According to the second aspect of the present invention, there is provided a method of controlling a focus detection apparatus including a line sensor including a photoelectric conversion element configured to receive light from an object and an integrating capacitor configured to integrate charges generated in the photoelectric conversion element and a storage unit configured to store information concerning a defective pixel of the line sensor, the method comprising: a first comparison step of comparing a signal from the defective pixel with a predetermined threshold; a switching step of switching between a first accumulation mode of transferring charges generated in the photoelectric conversion element to the corresponding integrating capacitor during a charge accumulation period of the photoelectric conversion element and a second accumulation mode of accumulating, in a pixel, charges generated in the photoelectric conversion element during the charge accumulation period without transferring the charges to the integrating capacitor until an end of the charge accumulation period, transferring the charges to the integrating capacitor after the end of the charge accumulation period, and integrating the charges in the integrating capacitor; and a control step of controlling the switching step so as to set the line sensor in the first accumulation mode if it is determined in the first comparison step that a signal from the defective pixel is not more than the predetermined threshold and set the line sensor in the second accumulation mode if it is determined in the first comparison step that a signal from the defective pixel is larger than the threshold.

Further features of the present invention will become apparent from the following description of exemplary embodiments with reference to the attached drawings.

BRIEF DESCRIPTION OF THE DRAWINGS

FIG. 8 is a timing chart showing an operation in the first accumulation mode;

FIG. 9 is a timing chart showing an operation in the second accumulation mode;

FIGS. 17A and 17B are graphs showing signals generated from object images;

FIGS. 20A and 20B are graphs showing signals generated from object images and a defective pixel signal.

DESCRIPTION OF THE EMBODIMENTS

Embodiments of the present invention will be described in detail below with reference to the accompanying drawings.

First Embodiment

Figure 1:
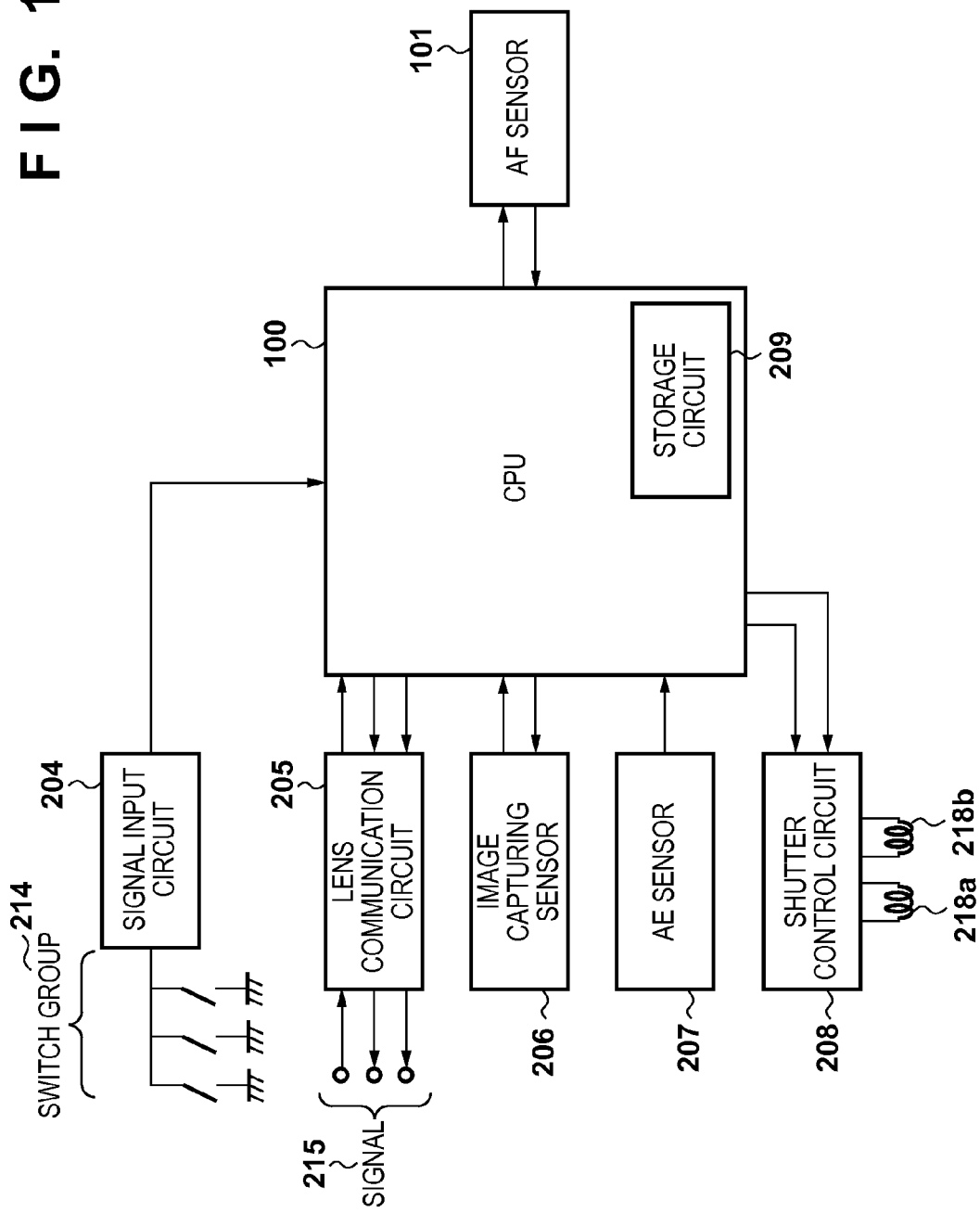
FIG. 1 is a block diagram showing the arrangement of a camera according to the first embodiment of the present invention.

FIG. 1 is a block diagram showing the arrangement of a digital camera as an image capturing apparatus according to the first embodiment of the present invention.

A camera microcomputer (to be written as a CPU hereinafter) 100 controls the overall camera (image capturing apparatus). A signal input circuit 204 for detecting a switch group 214 for various types of operations of the camera, an image capturing sensor (image sensor or image capturing means) 206, and an AE sensor 207 are connected to the CPU 100. In addition, a shutter control circuit 208 for controlling shutter magnets 218a and 218b and an AF sensor (focus detection sensor or focus detection device) 101 are also connected to the CPU 100. The CPU 100 can control a focus position or a stop by transmitting a signal 215 to an imaging lens 300 (see FIG. 2) via a lens communication circuit 205. The operation of the camera is decided by the settings made by the switch group 214.

The AF sensor 101 includes line sensors (see FIG. 4). The CPU 100 controls the AF sensor 101 to detect a defocus amount from the contrast distribution of an object which is obtained by the line sensors and control the focus position of the imaging lens 300 (see FIG. 2). The CPU 100 also has a function as a computation means for performing focus detection computation based on signals from the line sensors.

The CPU 100 detects the luminance of an object and decides the f-number or shutter speed of the imaging lens 300 by controlling the AE sensor 207. The CPU 100 then controls an f-number via the lens communication circuit 205, and controls a shutter speed by adjusting the energization times of the shutter magnets 218a and 218b via the shutter control circuit 208. The CPU 100 further performs a shooting operation by controlling the image capturing sensor 206.

The CPU 100 incorporates a storage circuit 209 including a ROM storing programs for controlling camera operations, a RAM for storing variables, and an EEPROM (Electrically Erasable Programmable Read-Only Memory) for storing various types of parameters. The storage circuit 209 also stores information concerning a defective pixel portion in a line sensor checked in advance in a manufacturing process or the like.

The optical arrangement of the camera will be described next with reference to FIG. 2. Most of a light beam from an object which has entered via the imaging lens (imaging optical system) 300 is reflected upward by a quick return mirror 305 and is formed into an object image on a viewfinder screen 303. The user of the camera can observe this image via a pentaprism 301 and an eyepiece lens 302. Part of the light beam from the object is transmitted through the quick return mirror 305 and bent downward by a sub-mirror 306 to be formed into an image on the AF sensor 101 via a visual field mask 307, a field lens 311, a stop 308, and a secondary image forming lens 309. It is possible to detect the focus state of the imaging lens 300 by processing the image signal obtained by photoelectrically converting this object image. When performing shooting, the quick return mirror 305 jumps up, and all light beams are formed into an image on the image capturing sensor 206, thus performing exposure on the object image. In other words, the image capturing sensor 206 photoelectrically converts the object image formed by the imaging optical system.

Figure 2:
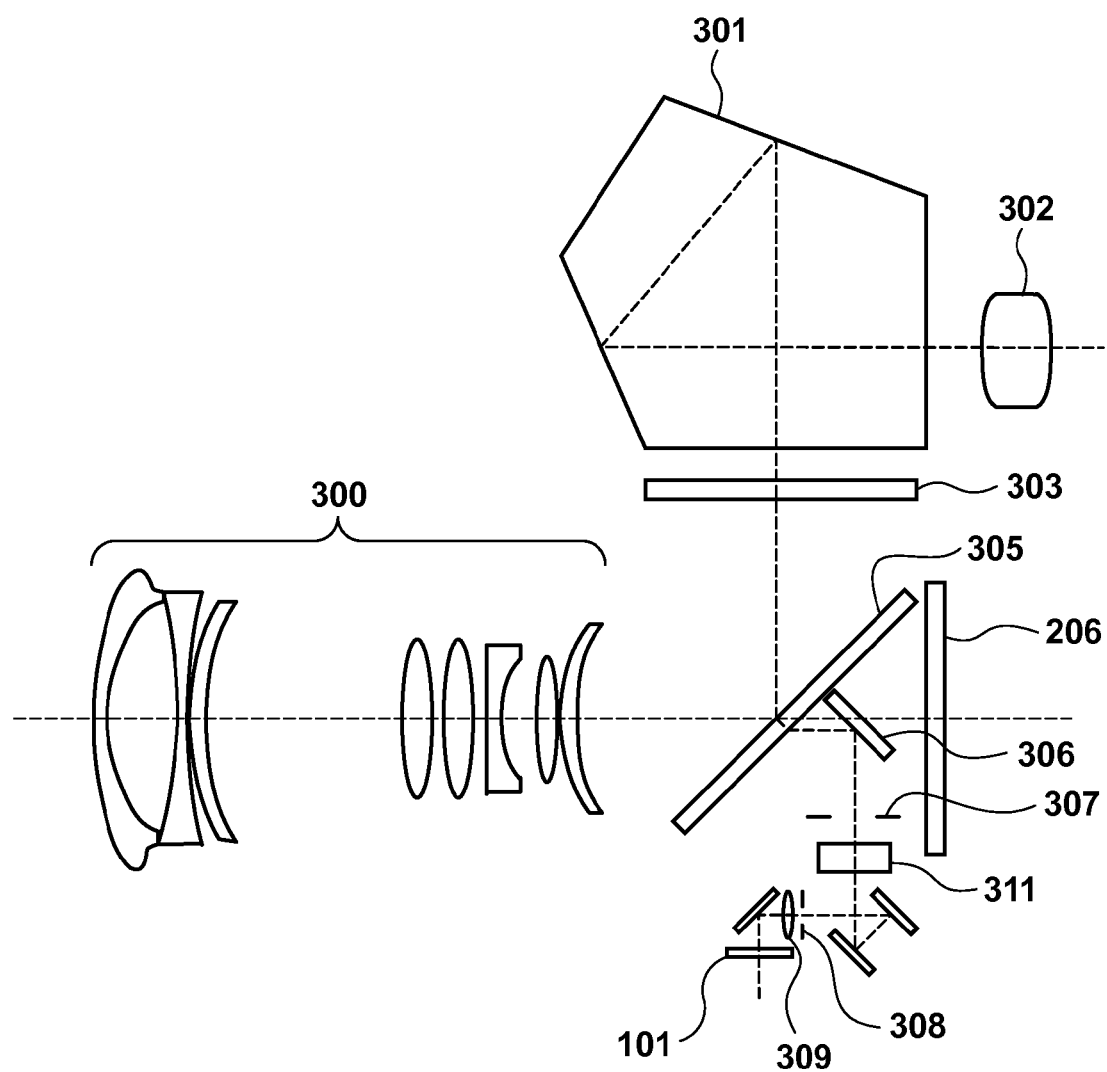
FIG. 2 is a view showing the arrangement of an optical system in the camera according to the first embodiment.

The focus detection method of the focus detection apparatus (constituted by the optical system ranging from the visual field mask 307 to the secondary image forming lens 309 and the AF sensor 101 in FIG. 2) in this embodiment is the known phase difference detection method.

Figure 3:
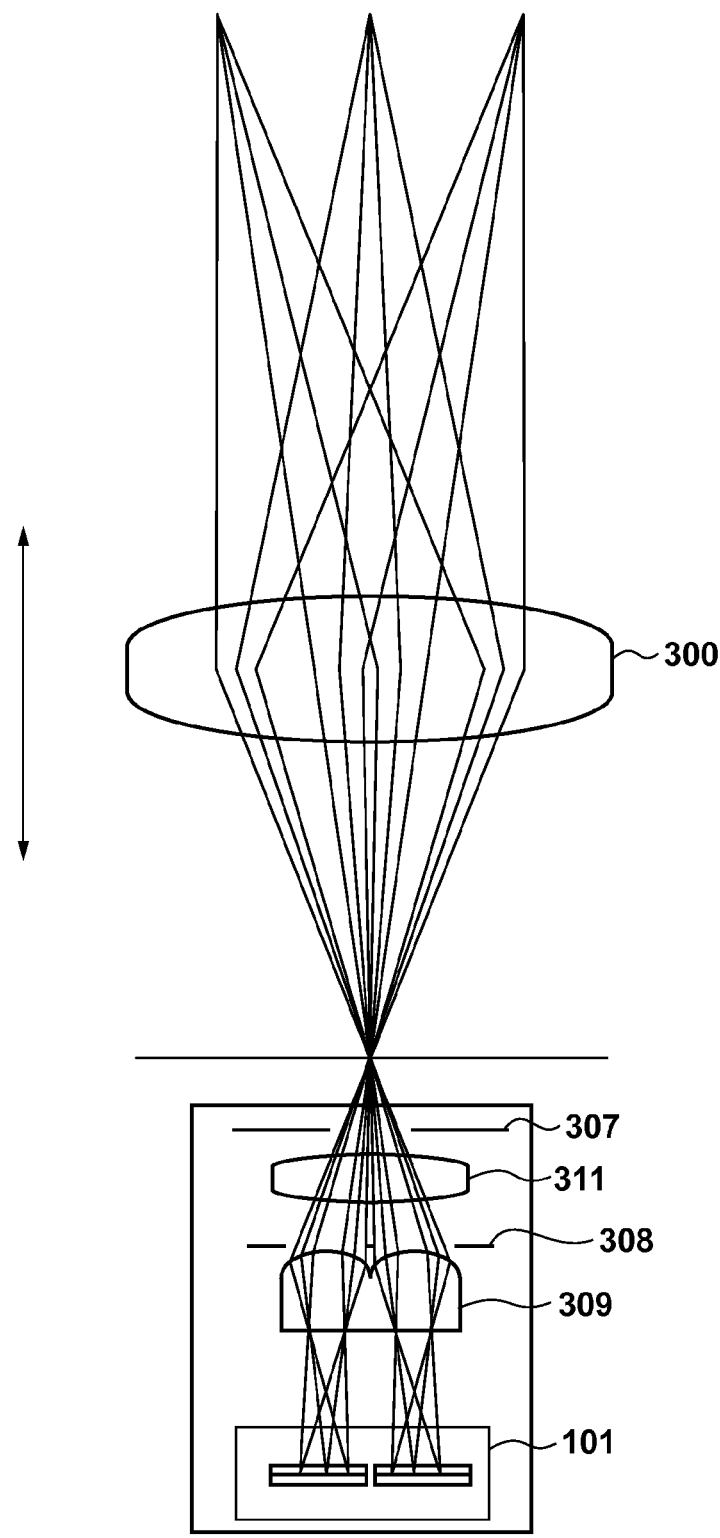
FIG. 3 is a view showing the optical arrangement of a focus detection apparatus.

FIG. 3 shows the detailed arrangement of the optical system associated with focus detection. A light beam from an object which has passed through the imaging lens 300 is reflected by the sub-mirror 306 (see FIG. 2) and is temporarily formed into an image at a position near the visual field mask 307 on a plane conjugate to the imaging plane of the image capturing sensor 206. FIG. 3 is a development view of optical paths reflected and folded by the sub-mirror 306. The visual field mask 307 is a member for shielding unnecessary light other than light from a focus detection are (to be also referred to as an AF frame hereinafter) within a frame.

The field lens 311 functions to form light from each aperture portion of the stop 308 into an image at a position near the exit pupil of the imaging lens 300. The secondary image forming lens 309 is arranged behind the stop 308, which is constituted by a pair of two lenses each corresponding to a corresponding one of the aperture portions of the stop 308. Each light beam passing through the visual field mask 307, the field lens 311, the stop 308, and the secondary image forming lens 309 is formed into an image on a corresponding line sensor on the AF sensor 101.

The relationship between the line sensors on the AF sensor 101 and the AF frame in the imaging frame will be described with reference to FIGS. 4A to 4C. For the sake of easy understanding, this embodiment will exemplify an image capturing apparatus having one AF frame within an imaging frame.

Figure 4A:
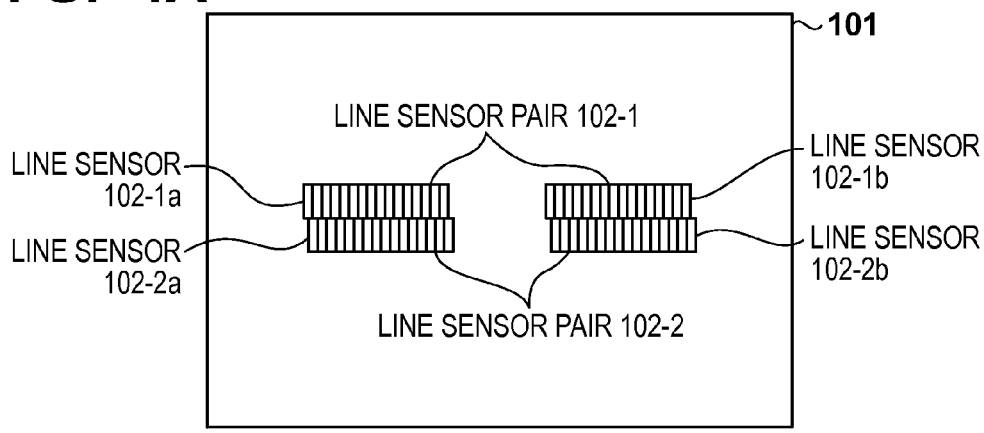
FIGS. 4A to 4C are views showing the relationship between the arrangement of line sensors and an AF frame.

FIG. 4A is a view showing the arrangement of the line sensors of the AF sensor 101. Line sensors 102-1a and 102-2a are parallelly arranged adjacent to each other so as to be shifted from each other by ½ pixel (staggered). Line sensors 102-1b and 102-2b are parallelly arranged adjacent to each other so as to be shifted from each other by ½ pixel (staggered). The line sensors 102-1a and 102-1b and the line sensors 102-2a and 102-2b are respectively paired via the secondary image forming lens 309 to form line sensor pairs 102-1 and 102-2. The line sensor pairs 102-1 and 102-2 each are a pair of line sensors which receive light beams passing through different pupil areas of the imaging lens 300. A defocus amount is detected by detecting the phase difference between the two images output from these pairs of line sensors.

Figure 4B:
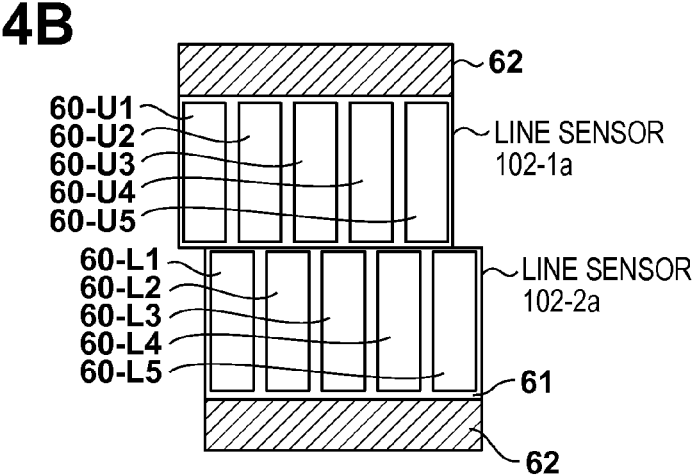

FIG. 4B shows an example of the arrangement of the line sensors 102-1a and 102-2a. For the sake of easy understanding, each line sensor is constituted by five pixel portions. The line sensor 102-1a is constituted by photodiodes (light-receiving units) 60-U1 to 60-U5. The line sensor 102-2a is constituted by photodiodes (light-receiving units) 60-L1 to 60-L5. The photodiodes 60-U1 to 60-U5 and the photodiodes 60-L1 to 60-L5 are arranged at the same pixel pitch. Note that, as will be described later, each pixel portion includes a switch, a MOS transistor, and a capacitor in addition to the photodiode. However, FIG. 4B omits an illustration of switches, capacitors, and amplification circuits, and shows only photodiodes and an element isolation area 61. The switches, the capacitors, and the amplification circuits are provided on a light-shielding layer 62, and each are formed adjacent to the photodiode formation area.

Figure 4C:
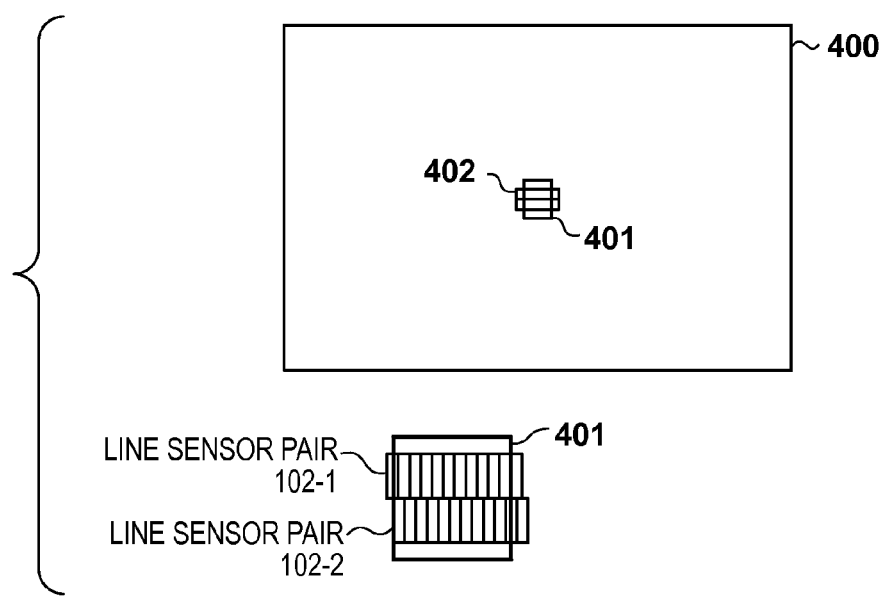

FIG. 4C is a view showing the arrangement of an AF frame displayed in a viewfinder 400 and an AF visual field 402 formed from the line sensors on the AF sensor 101. The line sensor pairs 102-1 and 102-2 are arranged in an AF frame 401. Two line sensor pairs adjacent to each other are arranged in one AF frame, and the pixel pitch is equivalently halved (staggered). This can improve the focus detection accuracy for a high-frequency object. In other words, the line sensor pair 102-1 and the line sensor pair 102-2 are arranged to receive light beams passing through almost the same exit pupil.

Figure 5:
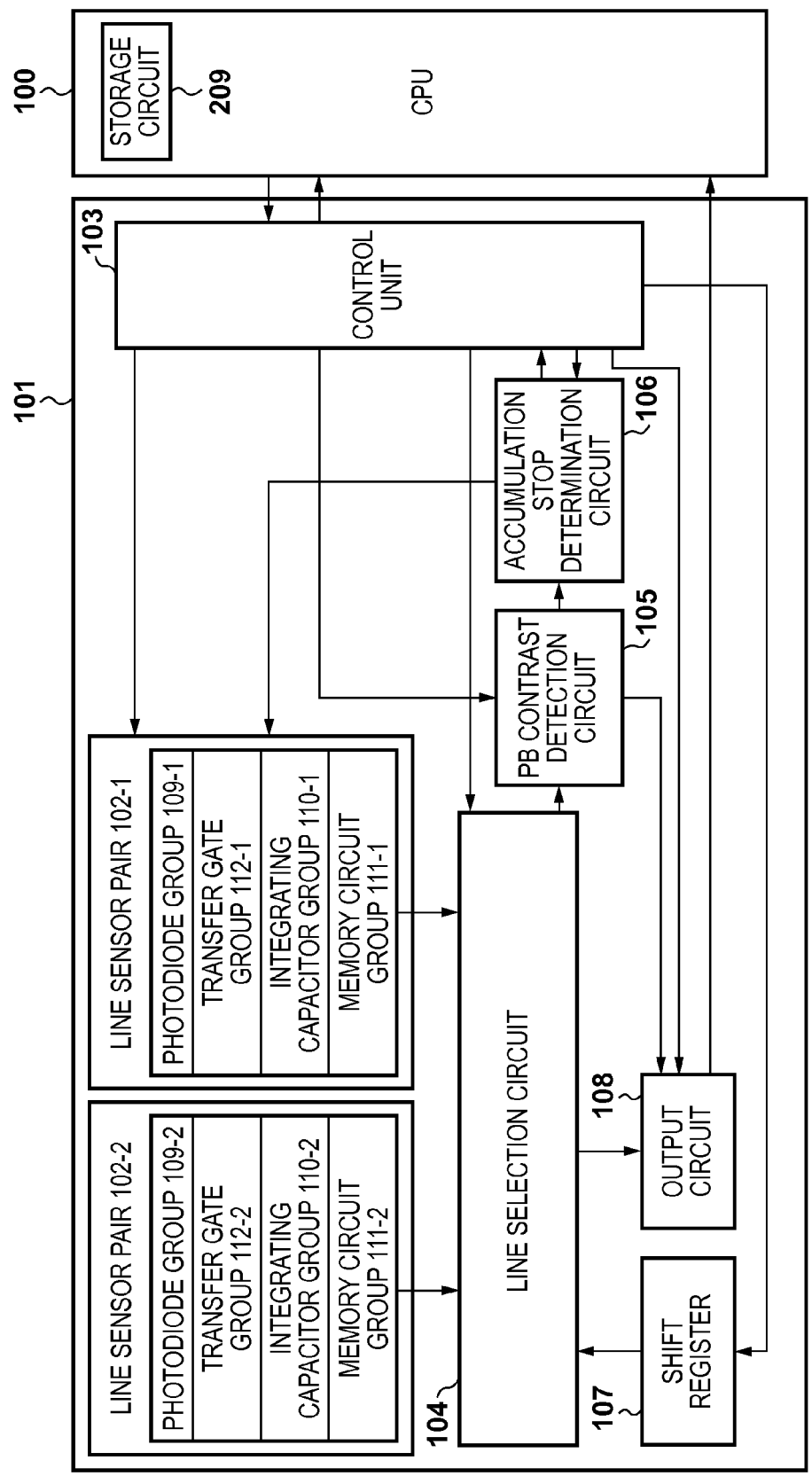
FIG. 5 is a block diagram showing the arrangement of the AF sensor.

The detailed circuit arrangement of the AF sensor 101 will be described with reference to the block diagram of FIG. 5. The object images formed by the secondary image forming lens 309 are photoelectrically converted by the line sensor pairs 102-1 and 102-2 and accumulated as charges.

The line sensor pair 102-1 includes a photodiode group 109-1 having an array of a plurality of photodiodes (photoelectric conversion elements), an integrating capacitor group 110-1 constituted by integrating capacitors respectively corresponding to the plurality of photodiodes, a memory circuit group 111-1, and a transfer gate group 112-1.

The line sensor pair 102-2 includes a photodiode group 109-2 having an array of a plurality of photodiodes, an integrating capacitor group 110-2 constituted by integrating capacitors respectively corresponding to the plurality of photodiodes, a memory circuit group 111-2, and a transfer gate group 112-2.

A control unit 103 receives an instruction from the CPU 100 and controls each block in the AF sensor 101.

A line selection circuit 104 selects one of the line sensor pair 102-1 and 102-2. The line selection circuit 104 has a function of transmitting accumulation signals from the line sensor pairs to a PB contrast detection circuit 105 and an output circuit 108 (both of which will be described later).

The PB contrast detection circuit 105 detects the largest signal a be referred to as a Peak signal hereinafter) and the smallest signal (to be referred to as a Bottom signal hereinafter) out of the pixel signals on the line selected by the line selection circuit 104. The PB contrast detection circuit 105 then generates a difference signal (to be referred to as a PB signal hereinafter) between the Peak signal and the Bottom signal, and outputs the Peak signal and the PB signal to an accumulation stop determination circuit 106.

Figure 6:
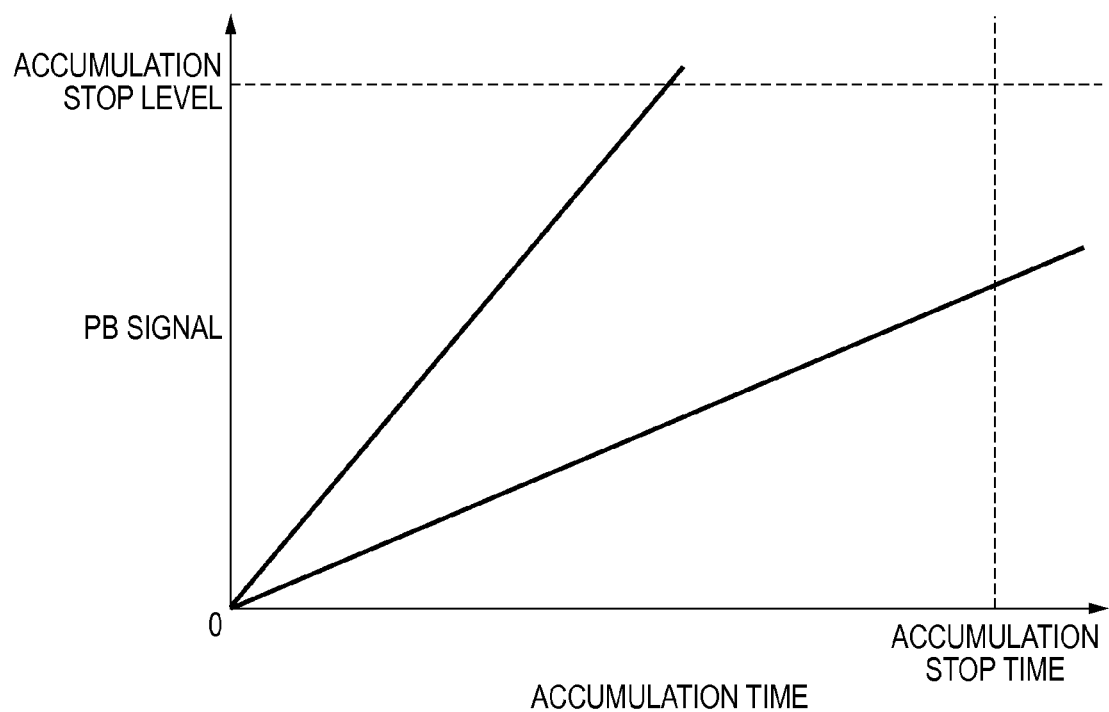
FIG. 6 is a graph for explaining a method of controlling PB signals and an accumulation time.

FIG. 6 is a graph showing the relationship between the accumulation time (charge accumulation period) and the signal amount of a PB signal as an output signal from the PB contrast detection circuit 105. Accumulation time "0" is the accumulation start timing. The amount of the PB signal increases as the time elapses. The accumulation stop determination circuit 106 compares the PB signal with the accumulation stop level. When the PB signal exceeds the accumulation stop level, the accumulation stop determination circuit 106 outputs an accumulation stop determination signal to the control unit 103.

The control unit 103 outputs the accumulation stop signal to the line sensor pair selected by the line selection circuit 104 to stop accumulation in the pixel portions of the selected line sensor pair. The control unit 103 also outputs, to the CPU 100, an accumulation end signal and information of the line where the accumulation has ended. If the PB signal has not reached the target value within a predetermined time, the CPU 100 outputs an accumulation stop signal to the control unit 103 to forcibly stop accumulation. Although in this case, a PB signal is used for accumulation stop determination, a Peak signal may be used for accumulation stop determination.

The control unit 103 drives a shift register 107 so as to output the pixel signals accumulated in the line sensor pairs 102-1 and 102-2 pixel by pixel to an output circuit 108. The output circuit 108 extracts a contrast component from each pixel signal, performs processing such as amplification, and outputs the resultant signal to the A/D converter (not shown) of the CPU 100.

Figure 7:
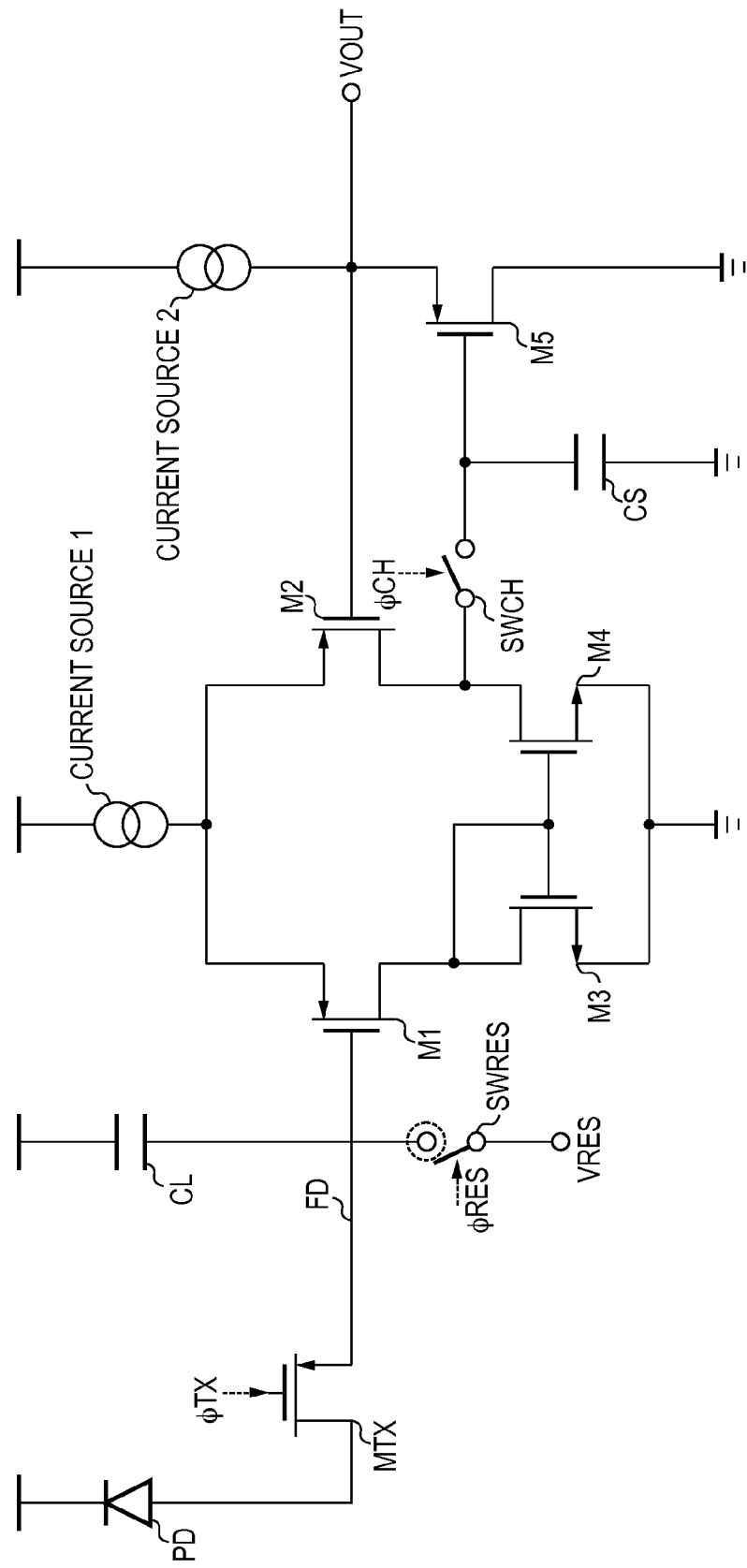
FIG. 7 is a circuit diagram of a circuit forming a line sensor.

FIG. 7 is a circuit diagram showing the detailed arrangement of a line sensor. The line sensor includes a photodiode PD, an integrating capacitor CL, a memory capacitor CS, a current source 1, a current source 2, MOS transistors M1, M2, M3, M4, and M5, and switches SWRES and SWCH. A voltage VRES is a reset potential. An output VOUT is connected to the line selection circuit 104. The switch SWRES is on/off-controlled by a signal φRES. The switch SWCH is on/off-controlled by a signal φCH.

In this case, the main defect (dark current) generating source in the pixel portion is the connecting portion (surrounded by the broken line in FIG. 7) on the FD side of the switch SWRES. An abnormally large dark current is sometimes generated by a defect in the contact portion between the wiring layer and the diffusion layer of the switch SWRES formed from a transistor.

Two types of accumulation mode operations of the above circuit will be described below.

FIG. 8 is a timing chart for the first accumulation mode. The CPU 100 sets an accumulation mode by transmitting an instruction to the control unit 103. In addition, the CPU 100 starts the accumulating operation by transmitting an instruction to the control unit 103.

The control unit 103 turns on first the switches SWRES and SWCH and then resets the capacitors CL and CS. Thereafter, the control unit 103 starts signal accumulation by turning off the switch SWRES. During signal accumulation, since a transfer gate MTX is kept on, signal charges are continuously transferred to the integrating capacitor CL. Therefore, the accumulation state of signals can be monitored from the output VOUT, and hence it is possible to perform accumulation stop determination by using the PB contrast detection circuit 105 and the accumulation stop determination circuit 106.

On the other hand, since a dark current is kept generated from the contact portion of the switch SWRES to the FD portion, if the dark current is large, an accumulation stop is determined by the contrast based on the dark current before the accumulation of sufficient signals. When the accumulation stop is determined, the process shifts to a signal storing operation. The control unit 103 then holds signals in the capacitor CS by turning off the switch SWCH.

FIG. 9 is a timing chart for the second accumulation mode. The control unit 103 resets the capacitors CL and CS by turning on the switches SWRES and SWCH. Subsequently, the control unit 103 starts signal accumulation by sequentially turning off the transfer gate MTX and the switch SWRES.

During signal accumulation, since the transfer gate MTX is off, it is not possible to monitor the accumulation state of signals from the output VOUT. It is therefore impossible to determine an accumulation stop by using the PB contrast detection circuit 105 and the accumulation stop determination circuit 106.

As will be described later, according to this embodiment, when she CPU 100 sets one line sensor in the second accumulation mode, the other line sensor is set in the first accumulation mode. For this reason, the control unit 103 stops accumulation in the line sensor pair set in the second accumulation mode along with stop determination of the line sensor pair set in the first accumulation mode, and performs a signal storing operation.

In a signal storing operation, first of all, the control unit 103 resets the capacitor CL, the FD portion, and the capacitor CS by turning on the switch SWRES. At this time, since the transfer gate MTX is kept off, the signal charges accumulated in she PD portion is kept held.

The control unit 103 transfers the signal charges accumulated in the photodiode PD to the integrating capacitor CL by turning on the transfer gate MTX after turning off the switch SWRES. The control unit 103 finishes the transfer of signal charges by turning off the transfer gate MTX, and then holds signals in the capacitor CS by turning off the switch SWCH.

In this manner, since the capacitor CL and the FD portion are reset immediately before the transfer of signal charges, dark current components generated during accumulation are removed. If a defect in a pixel portion of the other line sensor pair controlled in the first accumulation mode is sufficiently small and accumulation is properly controlled, the line sensor can obtain a sufficient amount of signals with relatively small amounts of dark current components.

Figure 10:
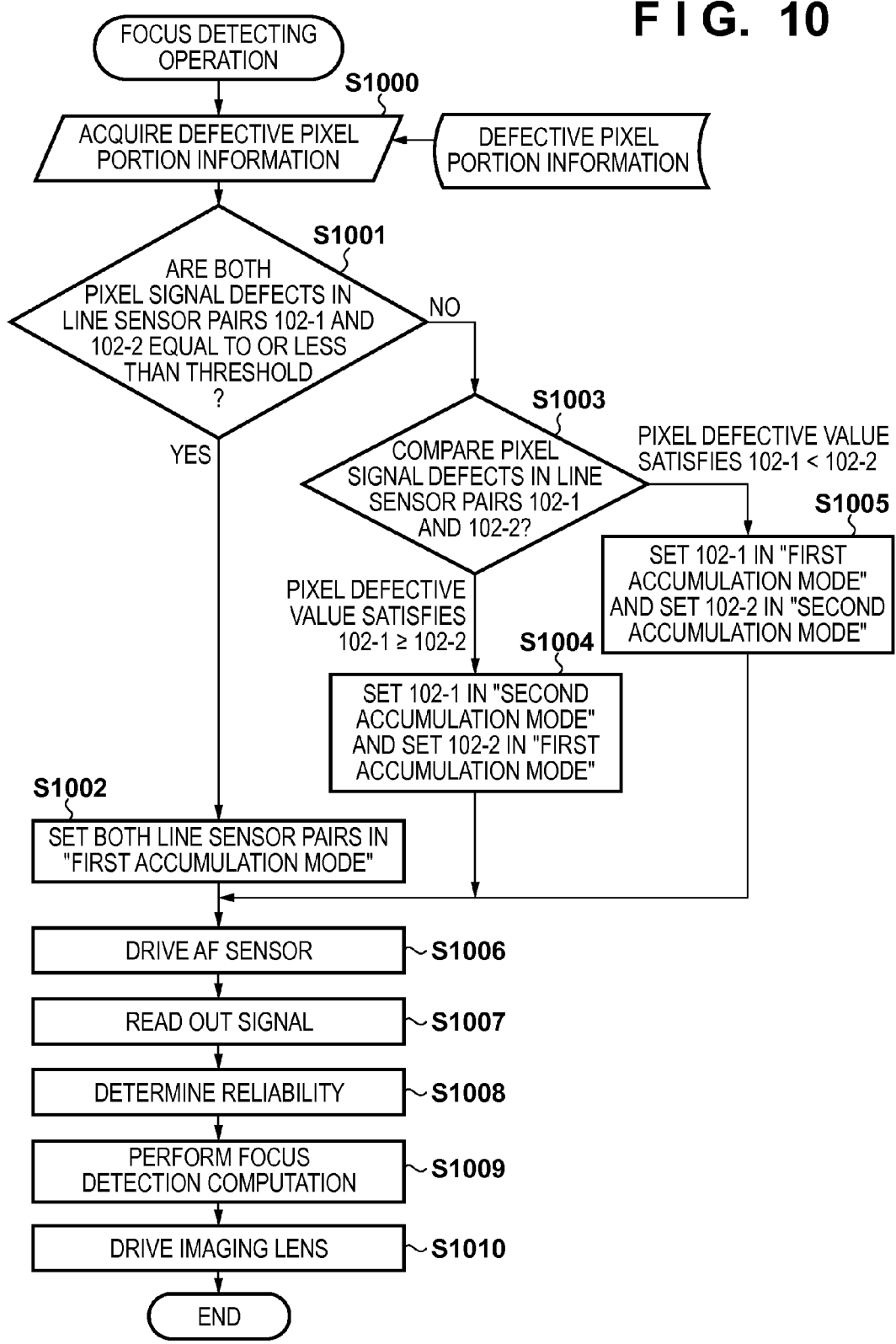
FIG. 10 is a flowchart showing a focus adjusting operation according to the first embodiment.

The operation of the focus adjustment apparatus having the above arrangement will be described in detail with reference to the flowchart of FIG. 10.

In step S1000, the CPU 100 reads out information concerning a defective pixel portion checked in advance in a manufacturing process or the like from the storage circuit 209. In this case, information concerning a defective pixel portion is the magnitude of a dark current in each pixel portion. In the following description, the maximum dark current value in each line sensor pair among dark currents in the respective pixel portions of each line sensor pair is written as a pixel defective value.

In step S1001, the CPU 100 determines whether a pixel defective value in each of the line sensor pairs 102-1 and 102-2 is equal so or less than a predetermined threshold. If any of pixel defective values in pixel portions of the two line sensor pairs is equal to or less than the threshold, she process advances to step S1002. In contrast to this, if any of the pixel defective values in the pixel portions of she two line sensor pairs is larger than the threshold, the process advances to the processing in step S1003.

In step S1002, the CPU 100 sets the two line sensor pairs in the first accumulation mode. In this case, since any of the pixel defective values in the respective line sensor pairs is smaller than the predetermined threshold, an accumulation stop is not determined because of a defective pixel portion before the accumulation of a sufficient signal amount. Therefore, optimal accumulation control is performed on each of the line sensor pairs of the AF sensor 101 in accordance with the object image projected on each line sensor pair.

In step S1003, the CPU 100 compares the magnitudes of pixel defective values in the two line sensor pairs. If the magnitude of the pixel defective value in the line sensor pair 102-1 is equal to or more than that in the line sensor pair 102-2 upon comparison between the pixel defective values in the respective line sensor pairs, the process shifts to step S1004. If the pixel defective value in the line sensor pair 102-2 is larger than that in the line sensor pair 102-1, the process shifts to step S1005.

In step S1004, the CPU 100 sets the line sensor pair 102-1 in the second accumulation mode, and sets the line sensor pair 102-2 in the first accumulation mode. In step S1005, the CPU 100 sets the line sensor pair 102-1 in the first accumulation mode, and sets the line sensor pair 102-2 in the second accumulation mode.

Upon setting the accumulation modes of the line sensor pairs in steps S1002, S1004, and S1005, the CPU 100 drives the AF sensor in step S1006.

In step S1006, as described above, the CPU 100 sends a control instruction to the control unit 103, and the control unit 103 controls each unit in accordance with the set mode.

If both the two line sensors are set in the first accumulation mode, the control unit 103 controls the line selection circuit 104 to monitor the signal accumulation states of the line sensor pairs 102-1 and 102-2 in a predetermined cycle. In addition, if one line sensor pair is set in the second accumulation mode, the control unit 103 controls the line selection circuit 104 to monitor the signal accumulation state of only the line sensor pair set in the first accumulation mode.

When signal accumulation in both the two line sensor pairs stops, the CPU 100 shifts the process to step S1007.

In step S1007, the CPU 100 reads out signals from the respective line sensor pairs via the output circuit 108. A signal from the line sensor pair set in the second accumulation mode is a signal containing only a minute dark current component, as described above.

In step S1008, the CPU 100 determines the reliability of the signal obtained from the line sensor pair and determines whether the signal can be used for focus detection computation. Indices for reliability determination include, for example, luminance information calculated from an obtained signal, contrast information, and the degree of coincidence between the images formed by a pair of two line sensors.

The signal obtained from the line sensor pair set in the second accumulation mode, in particular, has not been subjected to signal accumulation control based on the object image projected on itself, and hence may have been saturated. Assume that one line sensor pair is driven in the second accumulation mode. In this case, if a high-luminance point light source is projected on only the line sensor pair, the line sensor pair is saturated, even if the other line sensor pair driven in the first accumulation mode has been subjected to optimal accumulation control. In such a case, this signal cannot be used for focus detection computation.

In step S1009, the CPU 100 performs focus detection computation. Upon determining in step S1008 that the reliabilities of the two line sensor pairs are higher than a predetermined level, the CPU 100 combines signals from the two line sensor pairs and performs focus detection computation. If the reliability of at least one of the line sensor pairs is lower than the predetermined level, the CPU 100 performs focus detection computation by using a signal having a higher reliability.

In step S1010, the CPU 100 drives the imaging lens to a proper focus state based on the focus detection computation result.

As described above, this embodiment is configured to transfer the signal charges accumulated in a line sensor pair having a pixel portion with a large pixel defective value to the integrating capacitor upon signal accumulation and integrate the signal charges, thereby preventing accumulation from being stopped by a defect (dark current) in a pixel portion during accumulation. This allows even a line sensor pair having a large pixel defective value to accumulate a sufficient signal. Using this signal can implement accurate focus detection computation.

In addition, although this embodiment has exemplified the two line sensor pairs arranged in one AF frame, two line sensors arranged in a different AF frame near the above AF frame can be controlled in the same manner as described above.

Furthermore, this embodiment has exemplified the two line sensor pairs with one AF frame being arranged in the center. However, a plurality of line sensor pairs corresponding to a plurality of AF frames can also be controlled in the same manner as described above.

Second Embodiment

Figure 11:
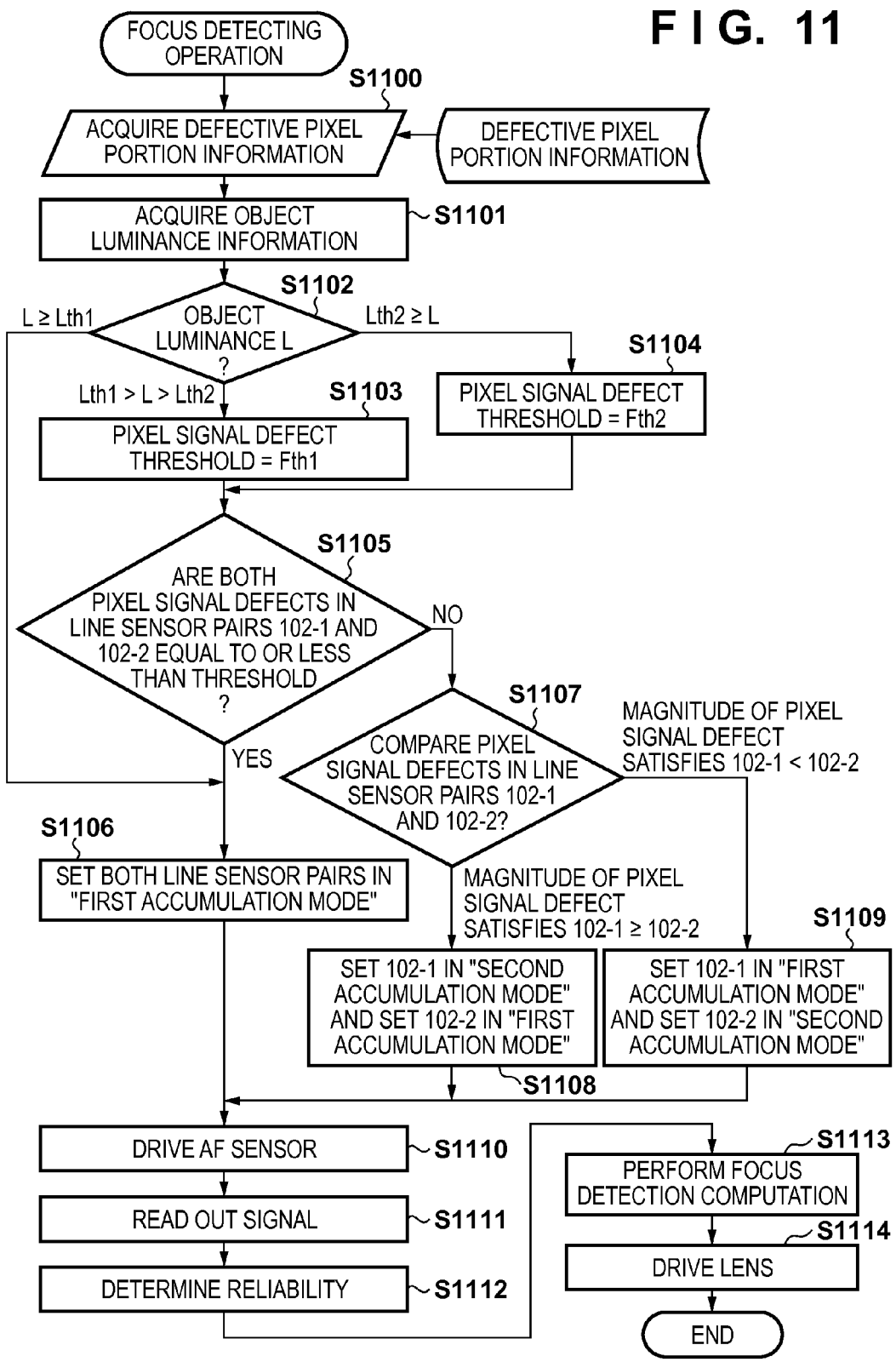
FIG. 11 is a flowchart showing a focus adjusting operation according to the second embodiment.

A focus detecting operation according to the second embodiment of the present invention will be described below with reference to the flowchart of FIG. 11. Note that since the arrangements of a camera and a focus detection apparatus are the same as those described in the first embodiment with reference to FIGS. 1 to 5, a description of them will be omitted.

In step S1100, a CPU 100 reads out information concerning a defective pixel portion checked in advance in a manufacturing process or the like from a storage circuit 209.

In step S1101, the CPU 100 obtains an object luminance L from the photometric value detected by an AE sensor 207.

In step S1102, the CPU 100 determines the object luminance L. If object luminance $L \geq Lth1$, the process advances to step S1106 to set both line sensor pairs 102-1 and 102-2 in the first accumulation mode.

In addition, if the object luminance L satisfies $Lth1 > L > Lth2$, the process advances to step S1103 to set a threshold for the determination of the magnitude of a pixel defective value to Fth1. The process then advances to step S1105. If the object luminance L satisfies $Lth2 \geq L$, the process advances to step S1104 to set a threshold for the determination of the magnitude of a pixel defective value to Fth2. The process then advances to step S1105. In this case, Fth1>Fth2. As the object luminance increases, the signal accumulation time in AF sensor driving decreases. Signal charges generated by a dark current as a defect in a pixel signal are proportional to the accumulation time. Therefore, as the signal accumulation time decreases, the influence of the defect on accumulation stop control on the line sensor pair controlled in the first accumulation mode becomes smaller. In addition, the random noise contained in an obtained signal is dominated by optical shot noise, and hence the random noise generated by a dark current can be ignored. If, therefore, the object luminance is high, pixel defective values can be permitted to some extent.

In step S1105, the CPU 100 determines whether pixel defective values in the two line sensor pairs are equal to or less than the threshold set in step S1103 or 1104. If the defective values are equal to or less than the threshold, the CPU 100 makes the process advance to step S1106 to set both the line sensor pairs 102-1 and 102-2 in the first accumulation mode. If the defective values are larger than the threshold, the process advances to step S1107.

The processing in steps S1107 to S1114 is the same as that in steps S1003 to S1010 (FIG. 10) in the first embodiment.

As described above, in this embodiment, the magnitude of a pixel defective value to be permitted is changed in accordance with the object luminance. This makes it possible to drive both the two line sensor pairs in the first accumulation mode as much as possible, thereby performing optimal accumulation control in accordance with the image projected on each line sensor pair. If the object is bright, since the accumulation states of the two line sensor pairs are monitored, there is little risk that a signal will be saturated. In addition, the influence of a defect in a pixel portion on accumulation control is small. On the other hand, when the object is dark, since a line sensor pair having a large pixel defective value is controlled in the second accumulation mode, a sufficient signal can be accumulated without being influenced by a defect in a pixel signal. As described above, this embodiment can implement accurate focus detection by performing proper accumulation control in a wide object luminance range.

This embodiment has exemplified the threshold for object luminances and the threshold for pixel defective values as two values. However, it is possible to set accumulation modes more finely with respect to object luminances by setting three or more thresholds.

Third Embodiment

Figure 12:
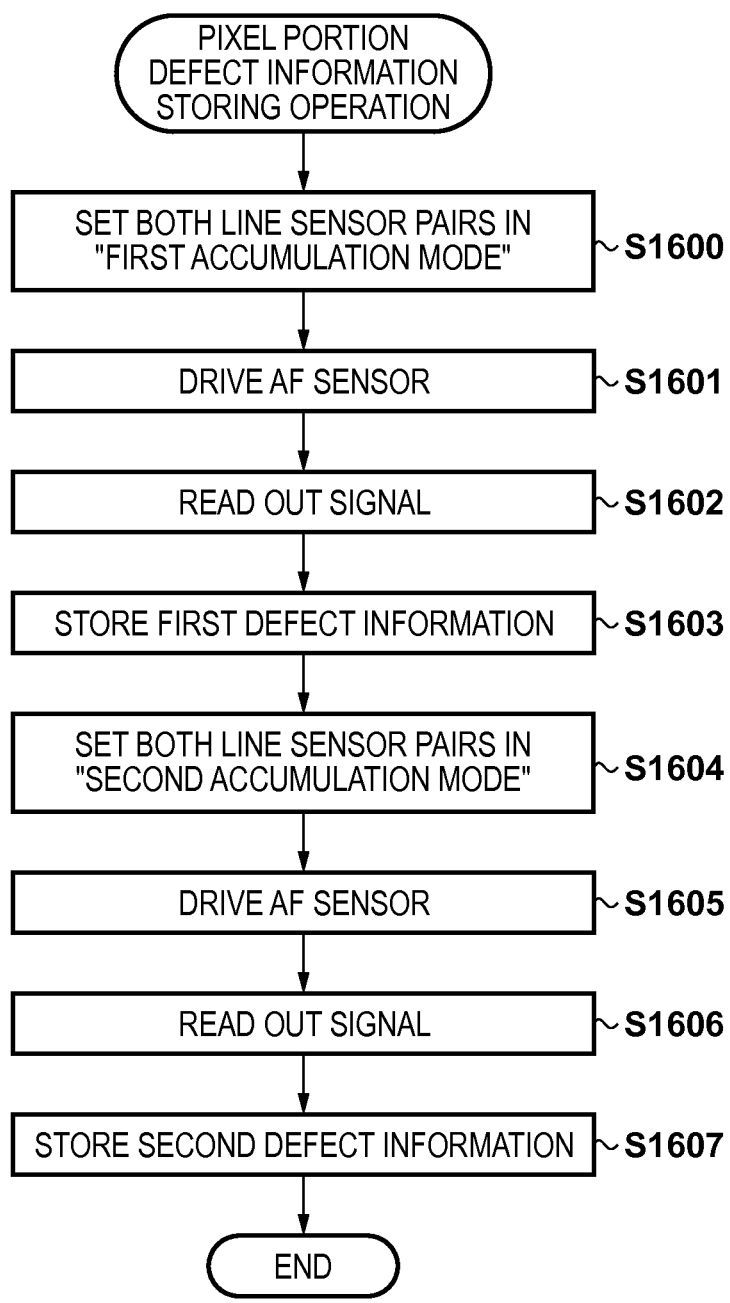
FIG. 12 is a flowchart showing a storing operation for defect information concerning a pixel portion according to the third embodiment.

In the third embodiment, a storing operation for defect information concerning a pixel portion and a correcting operation for a pixel signal read out from the defect information concerning the pixel portion will be described with reference to FIGS. 12 to 14. Since the arrangements of a camera and a focus adjustment apparatus are the same as those described in the first embodiment, a description of them will be omitted.

A storing operation for defect information concerning a pixel portion will be described first with reference to the flowchart of FIG. 12. This storing operation for the defect information concerning she pixel portion is performed while the focus adjustment apparatus is completely light-shielded in a manufacturing process.

Figure 15:
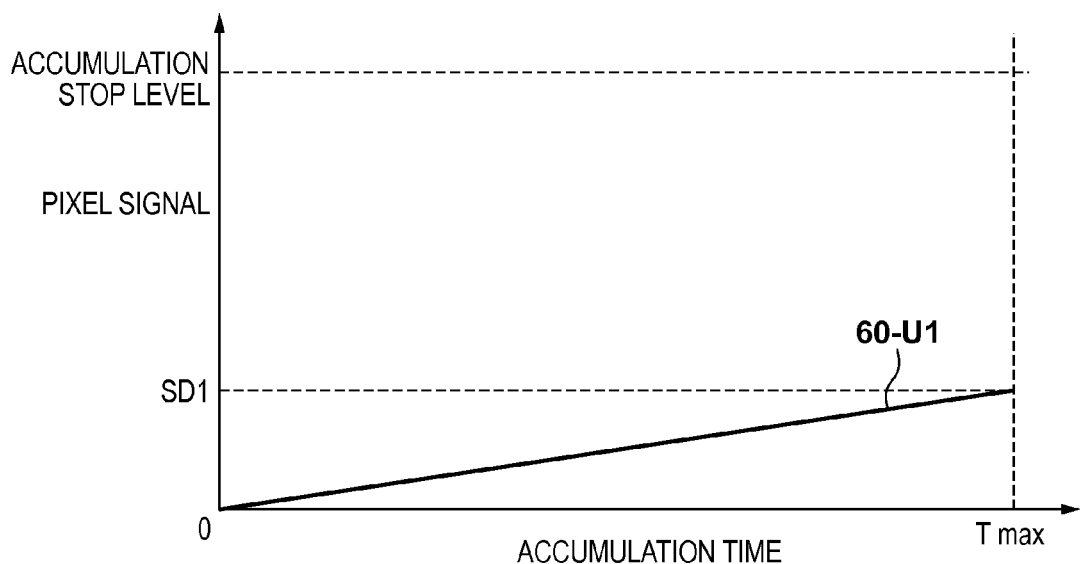
FIG. 15 is a graph showing the relationship between an accumulation time and a pixel signal based on a dark current.

In step S1600, a CPU 100 sets two line sensor pairs in the first accumulation mode, and drives an AF sensor in next step S1601. At this time, the focus adjustment apparatus is set in a dark state in which the apparatus is completely light-shielded, and a pixel signal is ideally 0. However, a pixel signal slightly grows owing to dark currents generated in a PD portion, a capacitor CL, and an FD portion in FIG. 7. The CPU 100 forcibly stops the accumulating operation of the AF sensor before the signal reaches an accumulation stop level. FIG. 15 shows an example of the relationship between an accumulation time and a pixel signal based on a dark current in the 60-U1 pixel portion of a line sensor 102-1a.

A dark current grows in proportion to an accumulation time. The CPU 100 forcibly stops the accumulating operation of the AF sensor at a maximum accumulation time Tmax of AF sensor driving. A dark current can be expressed by a slope SD/Tmax. In this case, this slope is defect information concerning a pixel portion. Letting SD(n) be a dark current in the nth pixel portion in the accumulation time Tmax, defect information DG(n) is represented by $$GD(n)=SD(n)/T\text{max} \quad (1)$$

Step S1602, the CPU 100 reads out a pixel signal from each line sensor pair via an output circuit 108. In step S1603, the CPU 100 calculates defect information concerning a pixel portion from the pixel signal as the dark current read out in step S1602 and the maximum accumulation time Tmax by using equation (1), and stores the calculated information as the first defect information in a storage circuit 209 in the CPU 100.

In step S1604, the CPU 100 sets the two line sensor pairs in the second accumulation mode, and drives the AF sensor in next step S1605. In the second accumulation mode, since the capacitor CL and the FD portion are reset during accumulation, the dark currents generated in the same circuit portions are removed, and only the dark current generated in the PD portion is accumulated as a pixel signal. Therefore, this pixel signal differs from the pixel signal obtained in the first accumulation mode.

In step S1606, the CPU 100 reads out a pixel signal from each line sensor pair via the output circuit 108. In step S1607, the CPU 100 calculates defect information concerning a pixel portion from the pixel signal as the dark current read out in step S1606 and the maximum accumulation time Tmax by using equation (1), and stores the calculated information as the second defect information in the storage circuit 209 in the CPU 100. The CPU 100 then terminates a series of storing operations for the defect information concerning the pixel portion.

Pixel signal correction in the operation of the focus adjustment apparatus will be described in detail next with reference to the flowcharts of FIGS. 13 and 14.

Figure 13:
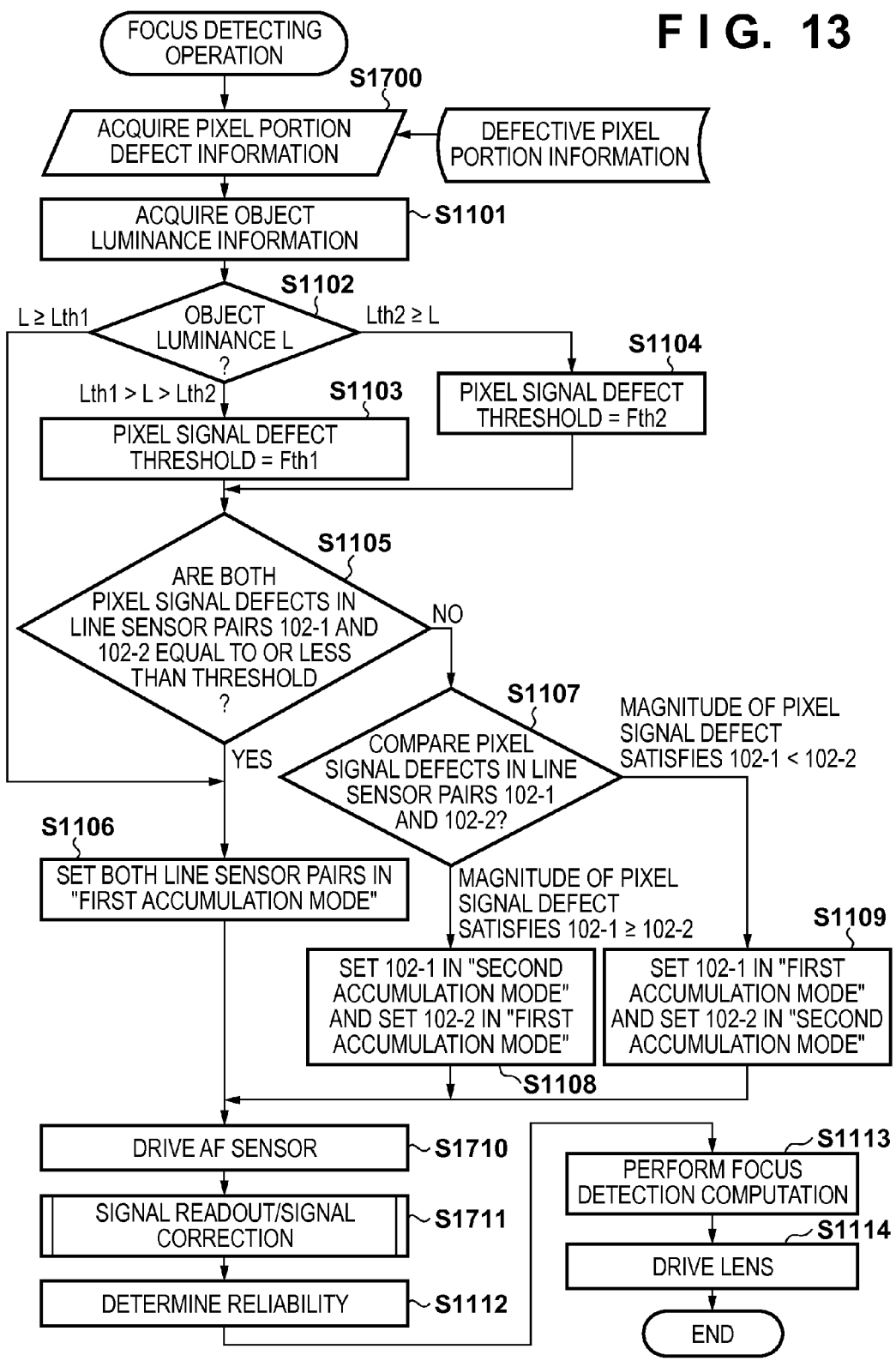
FIG. 13 is a flowchart showing a focus adjusting operation according to the third embodiment.

FIG. 13 is a flowchart for a focus adjusting operation according to the third embodiment. The same step numbers as those in FIG. 11 denote the same operations in FIG. 11, and hence a detailed description of them will be omitted.

In step S1700, the CPU 100 reads out the defect information concerning the pixel portion stored in advance in a manufacturing process or the like (the flowchart of FIG. 12) from the storage circuit 209. In this case, the defect information is a slope GD(n) of a dark current in each pixel portion. The operation in steps S1102 to S1109 is the same as that in the second embodiment. When defect information is to be compared with a threshold, the maximum value of DG(n) corresponding to each line sensor pair is used.

In step S1710, the CPU 100 drives the AF sensor. In this case, the CPU 100 measures the accumulation time in each line sensor pair to perform pixel signal correction (to be described later). In step S1711, the CPU 100 reads out a pixel signal from each line sensor pair via the output circuit 108, and corrects the readout pixel signal based on the defect information concerning the pixel portion acquired in step S1700. The correction method will be described in detail based on the sub-routine flowchart of FIG. 14.

Figure 14:
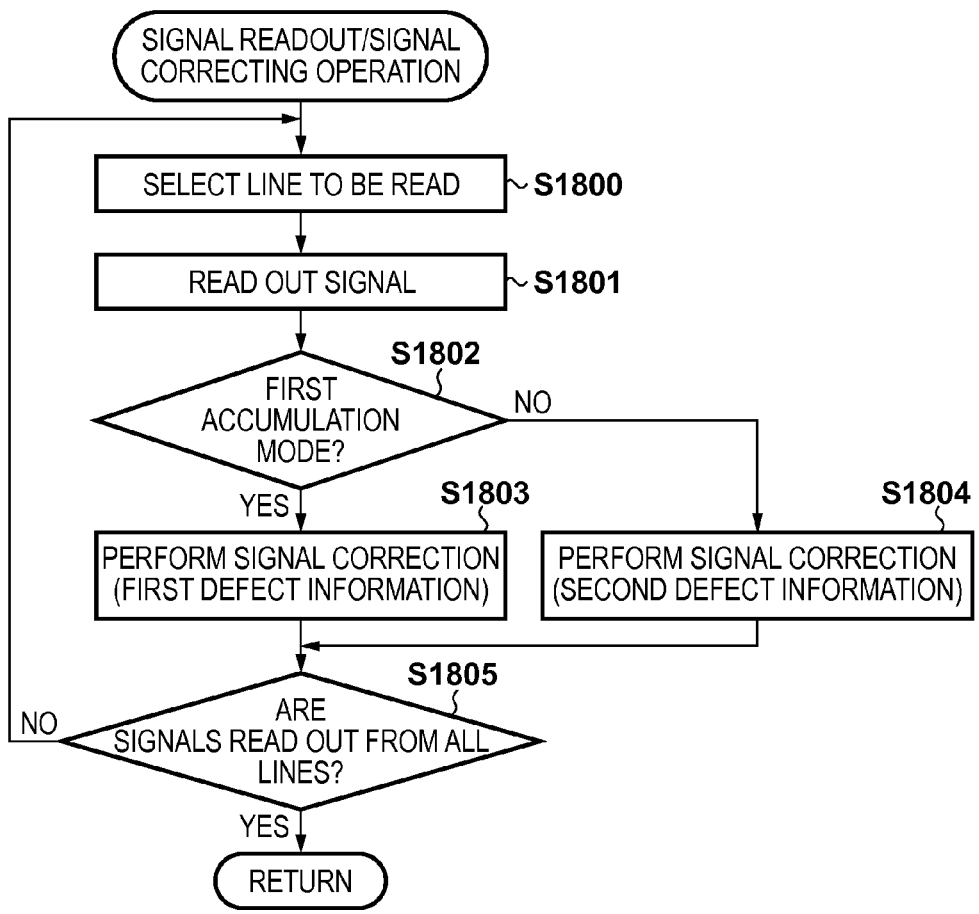
FIG. 14 is a sub-flowchart for signal readout and pixel signal correction according to the third embodiment.

In step S1800 in FIG. 14, the CPU 100 selects a line to be read, and reads out a signal from the line sensor pair via the output circuit 108 in next step S1801. In step S1802, the CPU 100 determines the accumulation mode setting for the read line. If the setting is the first accumulation mode, the process shifts to step S1803. If the setting is the second accumulation mode, the process shifts to step S1804.

In step S1803, the CPU 100 performs pixel signal correction from the first defect information corresponding to the first accumulation mode. The CPU 100 calculates a dark current from the defect information GD(n) concerning the pixel portion acquired in step S1700 and an accumulation time Tint measured in the operation in step S1710. The CPU 100 then performs pixel signal correction by subtracting the dark current portion from a readout pixel signal S(n). Letting S'(n) be a pixel signal after correction, a correction formula is given as follows:

$$S'(n)=S(n)-(GD(n)\times T\text{int}) \quad (2)$$

In step S1804, the CPU 100 performs pixel signal correction from the second defect information corresponding to the second accumulation mode. The correction formula to be used is the same as that in step S1803. That is, equation (2) is used.

In step S1805, the CPU 100 determines whether the readout operation from all the line sensor pairs is complete. If there is any line sensor pair from which a signal is not read out, the process returns to step S1800 to read out a signal from the next line sensor pair and repeat a pixel signal correcting operation. If the readout operation from all the line sensor pairs is complete, the process returns to the main flowchart.

In steps S1112 to S1114, the CPU 100 performs the same operation as that in the second embodiment based on the pixel signal S'(n) after correction, and finishes a series of focus adjusting operations.

As described above, defect information concerning a pixel portion in the first accumulation mode and defect information concerning a pixel portion in the second modulation mode are stored in advanced in a manufacturing process. In addition, when performing an actual focus adjusting operation, performing pixel signal correction based on the defect information corresponding to the set accumulation mode can properly correct a pixel signal, thus implementing more accurate focus adjusting operation.

Fourth Embodiment

Figure 16:
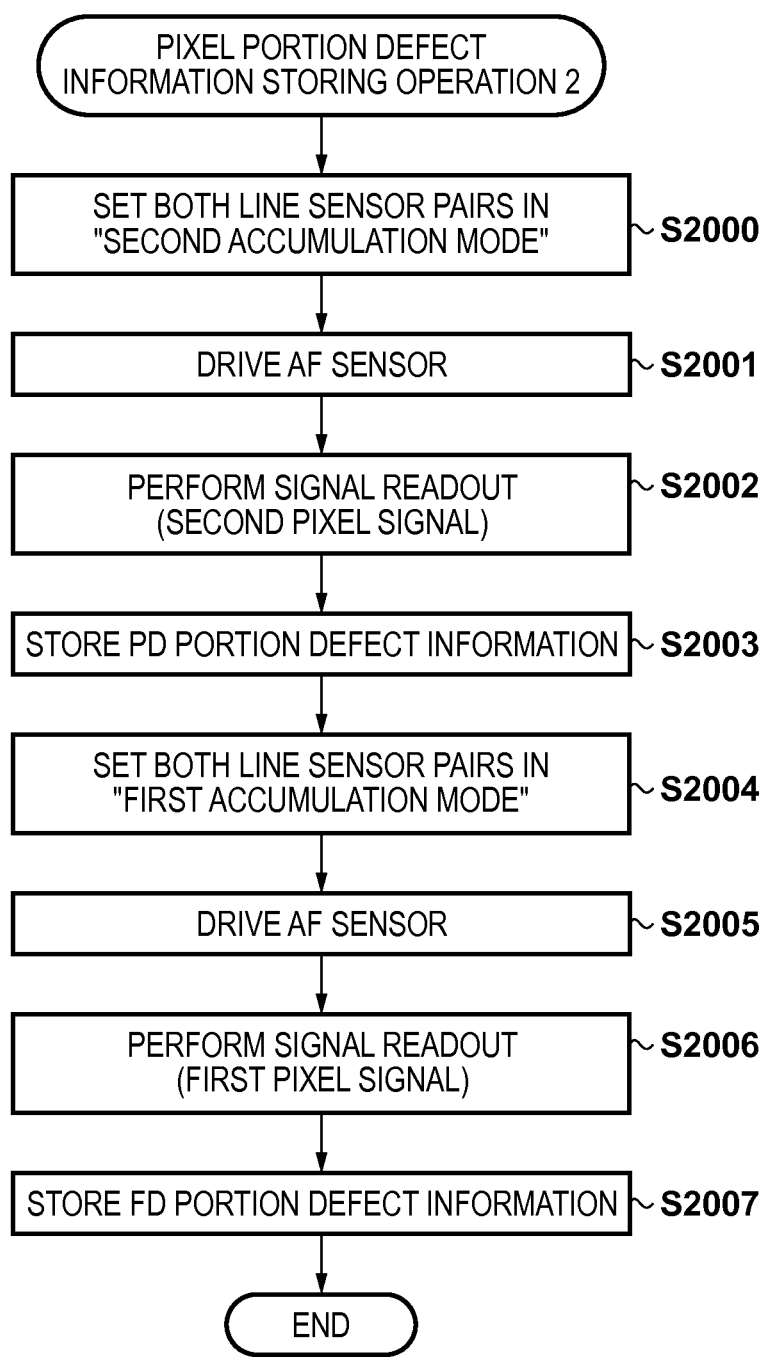
FIG. 16 is a flowchart showing a storing operation for defect information concerning a pixel portion according to the fourth embodiment.
Figure 18A:
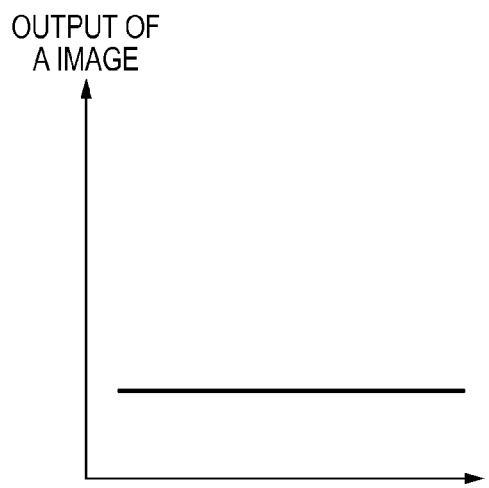
FIGS. 18A to 18C are graphs showing a signal from a defective pixel portion.
Figure 18B:
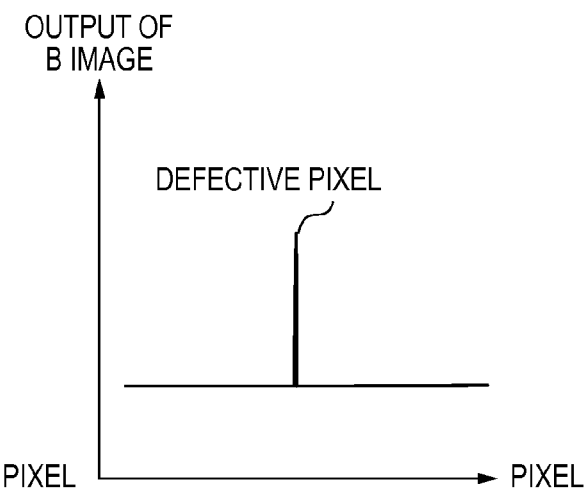
Figure 18C:
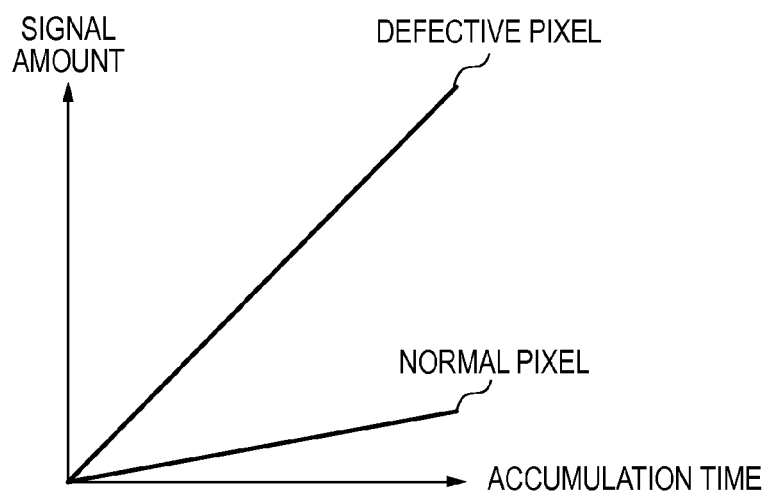
Figure 19:
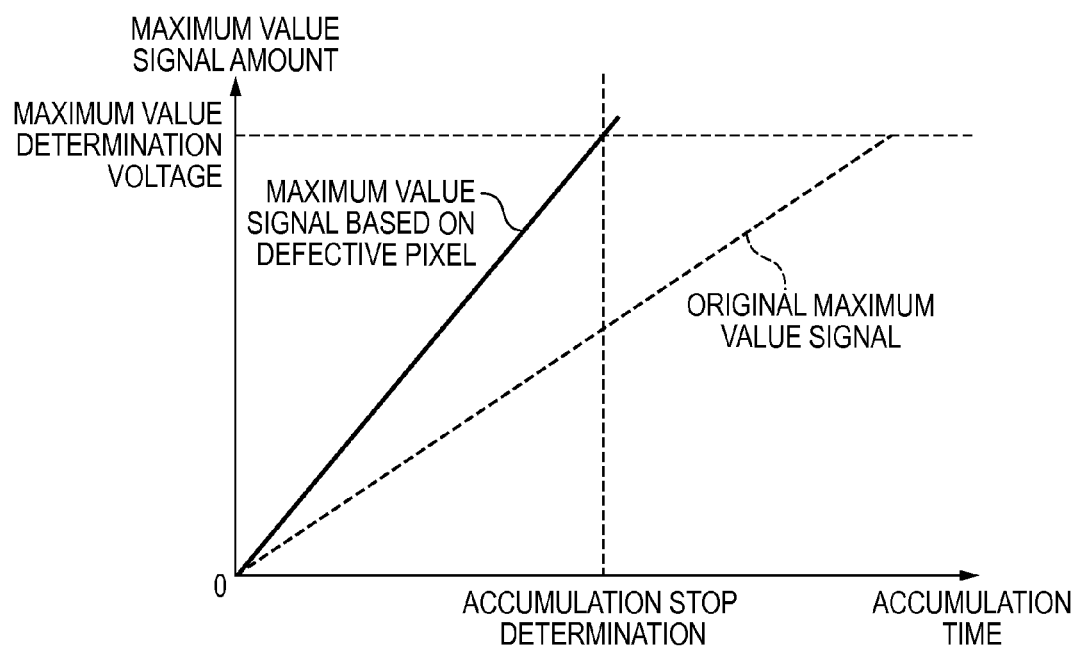
FIG. 19 is a graph showing the relationship between a defective pixel portion and accumulation control in the related art.

The fourth embodiment will exemplify a method of separating dark currents generated in "PD portion" and "capacitor CL and FD portion" (portions other than a photoelectric conversion element), storing the respective dark currents, and correcting a pixel signal, and will be described with reference to FIG. 16. Since the arrangements of a camera and a focus adjustment apparatus are the same as those described in the first embodiment, a description of them will be omitted.

A storing operation for defect information concerning a pixel portion according to the fourth embodiment will be described with reference to the flowchart of FIG. 16. The storing operation for the defect information concerning this pixel portion is performed while the focus adjustment apparatus is completely light-shielded in a manufacturing process as in the third embodiment.

In step S2000, a CPU 100 sets two line sensor pairs in the second accumulation mode. In next step S2001, the CPU 100 drives an AF sensor. When reaching a maximum accumulation time Tmax, the CPU 100 forcibly stops the accumulating operation of the AF sensor.

In step S2002, the CPU 100 reads out a signal from each line sensor pair via an output circuit 108. In this case, the readout pixel signal is temporarily stored as a second pixel signal S2(n) in a storage circuit 209. In this case, since a capacitor CL and an FD portion are reset during accumulation, the dark currents generated in the same circuit portions are removed from the pixel signal obtained in the second storage mode, only the dark current generated in the PD portion is left in the pixel signal.

In step S2003, the CPU 100 calculates defect information concerning the pixel portion from the pixel signal read out in step S2002 and the maximum accumulation time Tmax by using equation (1), and stores the calculated information as defect information GDPD(n) concerning the PD portion in the storage circuit 209 in the CPU 100.

In step S2004, the CPU 100 sets the two line sensor pairs in the first accumulation mode. In next step S2005, the CPU 100 drives the AF sensor. When reaching the maximum accumulation time Tmax, the CPU 100 forcibly stops the accumulating operation of the AF sensor.

In step S2006, the CPU 100 reads out a signal from each line sensor pair via the output circuit 108. The pixel signal obtained in the first accumulation mode is the one obtained by adding the dark currents generated in the capacitor CL and the FD portion to the dark current generated in the PD portion. In this case, the readout pixel signal is temporarily stored as a first pixel signal S1(n) in the storage circuit 209.

In step S2007, the CPU 100 calculates only the dark currents generated in the capacitor CL and the FD portion by subtracting the second pixel signal S2(n) from the first pixel signal S1(n) stored in the storage circuit 209. The CPU 100 calculates the defect information concerning the pixel portion from the difference signal (S(n)=S2(n)−S1(n)) by using equation (1), and stores the calculated information as defect information GDFD concerning the FD portion in the storage circuit 209 in the CPU 100. With this operation, the CPU 100 terminates a series of storing operations for the defect information concerning the pixel portion.

A method of correcting a pixel signal from defect information concerning a PD portion and defect information concerning an FD portion will be described next.

A dark current grows in proportion to an accumulation time. In addition, a dark current has a temperature dependence characteristic, and tends to exponentially increase with a rise in AF sensor temperature. In general, the dark current generated in the PD portion increases about twice with a rise in temperature by 4° C., and the dark current generated in the FD portion increases about twice with an increase in temperature by 8° C. Therefore, when correcting a pixel signal, it is necessary to calculate dark currents in the PD portion and the FD portion by using different temperature coefficients.

Letting T0 be a temperature at the time of a storing operation for defect information concerning a pixel portion in a manufacturing process and T be a temperature at the time of focus adjustment, an example of a correction formula for a pixel signal in the first accumulation mode is given as follows:

$$S'(n)=S(n)-(GDPD(n)\times Tint\times 2^{((T-T0)/4)})-(GDFD(n)\times Tint\times 2^{((T-T0)/8)}) \quad (3)$$

On the other hand, an example of a correction formula for a pixel signal in the second accumulation mode is given as follows:

$$S'(n)=S(n)-(GDPD(n)\times Tint\times 2^{((T-T0)/4)}) \quad (4)$$

In this manner, pixel signals are corrected by using equations (3) and (4) corresponding to the accumulation modes.

As has been described above, the dark currents generated in "PD portion" and "capacitor CL and FD portion" are separated from pixel signals in the first accumulation mode and the second accumulation mode and stored respectively. In addition, when performing an actual focus adjusting operation, it is possible to properly correct a pixel signal by correcting it based on a temperature coefficient and defect information corresponding to an accumulation mode in accordance with an environmental temperature, thereby implementing a more accurate focus adjusting operation.

Note that equations (3) and (4) each are an example, and the temperature coefficients to be used are not limited to those described above.

The preferred embodiments of the present invention have been above. However, the present invention is not limited to these embodiments, and various modifications and changes can be made within the scope of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-055621, filed Mar. 18, 2014 which is hereby incorporated by reference herein in its entirety.

What is claimed is:

1. A focus detection apparatus comprising:
a line sensor including a photoelectric conversion element configured to receive light from an object and an integrating capacitor configured to integrate charges generated in the photoelectric conversion element;
a storage unit configured to store information concerning a defective pixel of said line sensor;
a first comparison unit configured to compare a signal from the defective pixel with a predetermined threshold;
a switching unit configured to switch between a first accumulation mode of transferring charges generated in the photoelectric conversion element to the corresponding integrating capacitor during a charge accumulation period of the photoelectric conversion element and a second accumulation mode of accumulating, in a pixel, charges generated in the photoelectric conversion element during the charge accumulation period without transferring the charges to the integrating capacitor until an end of the charge accumulation period, transferring the charges to the integrating capacitor after the end of the charge accumulation period, and integrating the charges in the integrating capacitor; and
a control unit configured to control said switching unit so as to set said line sensor in the first accumulation mode if said first comparison unit determines that a signal from the defective pixel is not more than the predetermined threshold and set said line sensor in the second accumulation mode if said first comparison unit determines that a signal from the defective pixel is larger than the threshold.

2. The apparatus according to claim 1, further comprising a plurality of said line sensors and a second comparison unit configured to compare signals from defective pixels in said plurality of line sensors, wherein said control unit causes said second comparison unit to compare signals from defective pixels of said plurality of line sensors, if any of the signals from the defective pixels in said plurality of line sensors is larger than the predetermined threshold, and controls said switching unit so as to set a line sensor, of said plurality of line sensors, in which the signal from the defective pixel is relatively small in the first accumulation mode and set a line sensor in which the signal from the defective pixel is relatively large in the second accumulation mode.

3. The apparatus according to claim 1, further comprising an acquisition unit configured to acquire luminance information of the object and a setting unit configured to set the predetermined threshold for determining a defective pixel in accordance with the acquired luminance information, wherein said control unit controls said switching unit so as to switch an accumulation mode of said line sensor in accordance with the predetermined threshold set by said setting unit.

4. The apparatus according to claim 1, wherein said storage unit stores in advance first defective pixel information of said line sensor in the first accumulation mode and second defective pixel information of said line sensor in the second accumulation mode.

5. The apparatus according to claim 4, wherein when said switching unit sets said line sensor in the first accumulation mode, a pixel signal obtained by said line sensor is corrected based on the first defective pixel information, and when said switching unit sets said line sensor in the second accumulation mode, a pixel signal obtained by said line sensor is corrected based on the second defective pixel information.

6. The apparatus according to claim 4, wherein the first defective pixel information is calculated based on a signal based on a defect in the photoelectric conversion element and a signal based on a defect in a portion other than the photoelectric conversion element including the integrating capacitor.

7. The apparatus according to claim 4, wherein a first formula for correcting a pixel signal obtained by said line sensor based on the first defective pixel information differs from a second formula for correcting a pixel signal obtained by said line sensor based on the second defective pixel information.

8. The apparatus according to claim 4, wherein the first defective pixel information and the second defective pixel information comprise information concerning a dark current component.

9. A method of controlling a focus detection apparatus including a line sensor including a photoelectric conversion element configured to receive light from an object and an integrating capacitor configured to integrate charges generated in the photoelectric conversion element and a storage unit configured to store information concerning a defective pixel of the line sensor, the method comprising:
a first comparison step of comparing a signal from the defective pixel with a predetermined threshold;
a switching step of switching between a first accumulation mode of transferring charges generated in the photoelectric conversion element to the corresponding integrating capacitor during a charge accumulation period of the photoelectric conversion element and a second accumulation mode of accumulating, in a pixel, charges generated in the photoelectric conversion element during the charge accumulation period without transferring the charges to the integrating capacitor until an end of the charge accumulation period, transferring the charges to the integrating capacitor after the end of the charge accumulation period, and integrating the charges in the integrating capacitor; and
a control step of controlling the switching step so as to set the line sensor in the first accumulation mode if it is determined in the first comparison step that a signal from the defective pixel is not more than the predetermined threshold and set the line sensor in the second accumulation mode if it is determined in the first comparison step that a signal from the defective pixel is larger than the threshold.

10. A non-transitory computer-readable storage medium storing a program for causing a computer to execute each step in a control method defined in claim 9.

* * * * *